Sept. 26, 1939. W. J. DE WITT 2,173,933
SHOE FORM
Filed Nov. 13, 1937 3 Sheets-Sheet 1
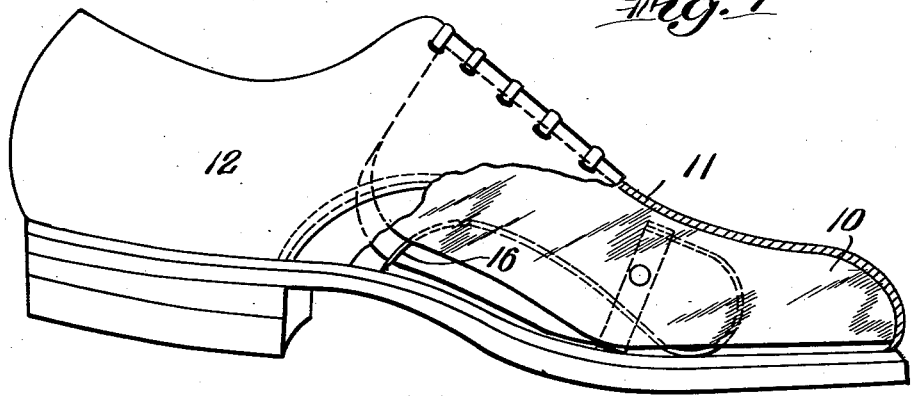
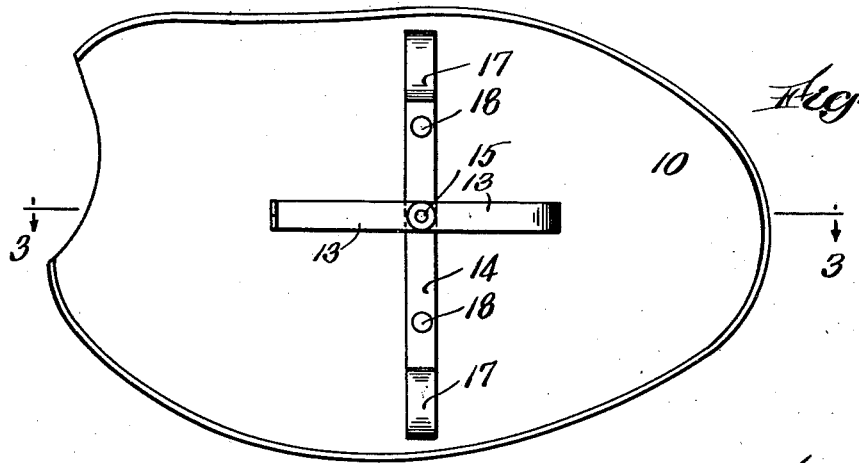
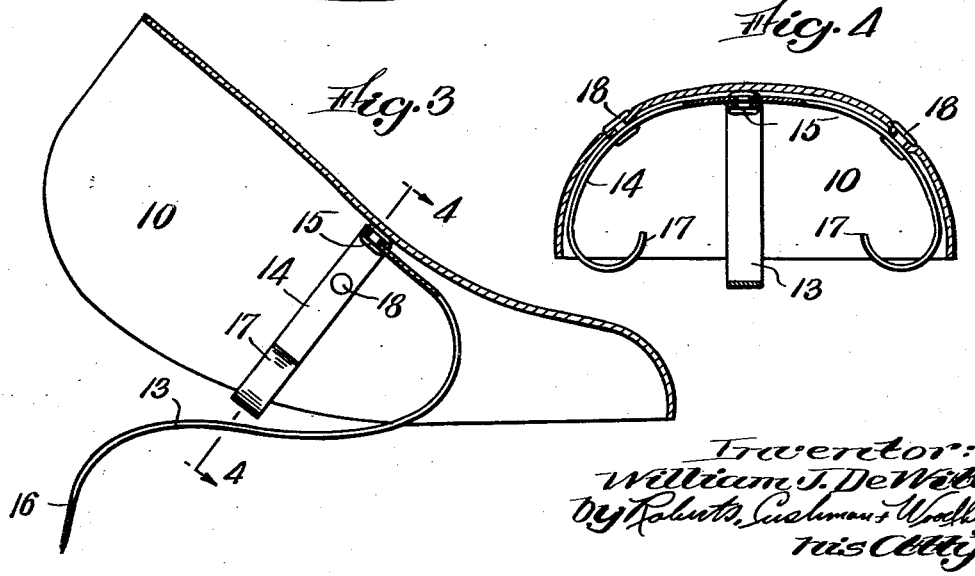
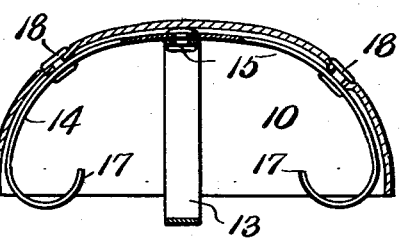

Sept. 26, 1939.   W. J. DE WITT   2,173,933
SHOE FORM
Filed Nov. 13, 1937   3 Sheets-Sheet 2
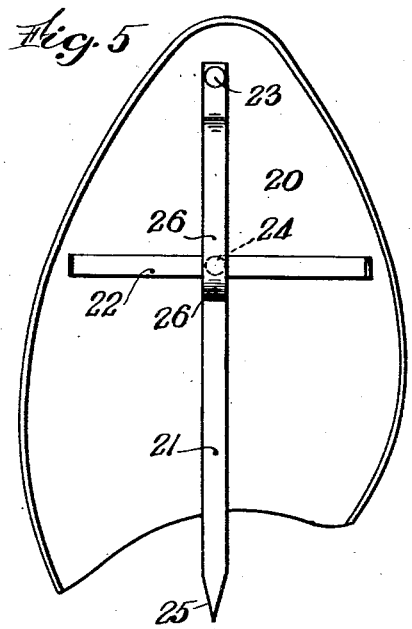
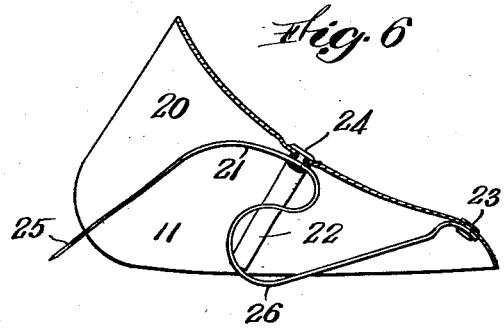
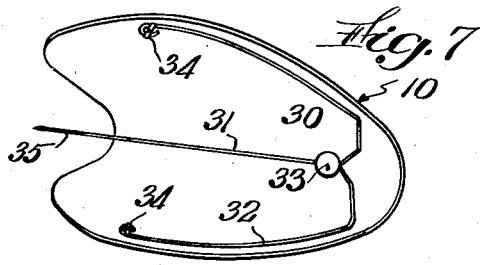
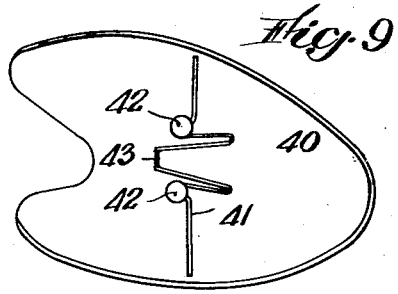
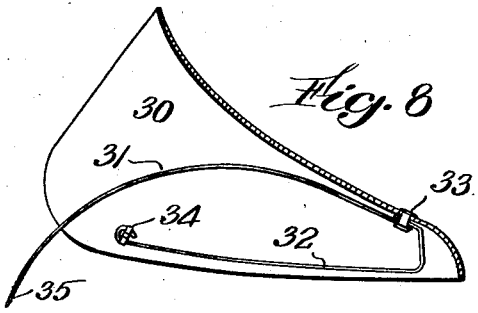
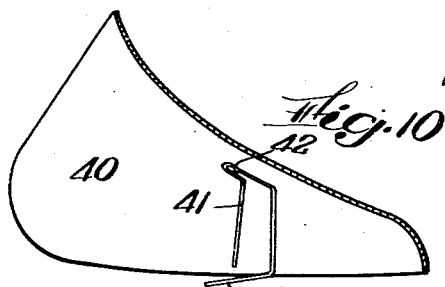
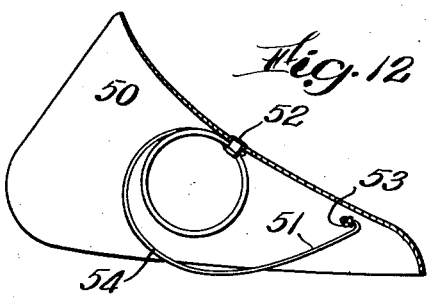
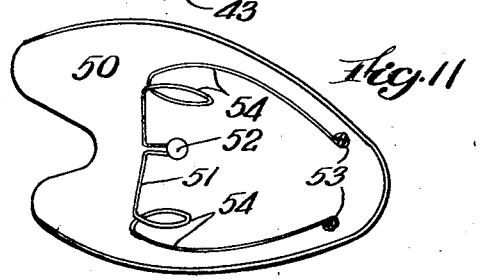
Inventor:
William J. DeWitt
by Roberts, Cushman & Woodberry
his Attys Sept. 26, 1939.  W. J. DE WITT  2,173,933
SHOE FORM
Filed Nov. 13, 1937  3 Sheets-Sheet 3

Inventor
William J. De Witt

Patented Sept. 26, 1939

2,173,933

UNITED STATES PATENT OFFICE 2,173,933

SHOE FORM

William J. De Witt, Auburn, N. Y., assignor to Shoe Form Co., Inc., Auburn, N. Y., a corporation of New York Application November 13, 1937, Serial No. 174,309

12 Claims. (Cl. 12—128.4)

This invention relates to an improvement in shoe forms and more particularly to such forms which comprise a toe form provided with means by which the toe form is held yieldably in contact with the toe of the shoe in which it is inserted.

Heretofore it has been the general practice to provide such toe forms with ball flanges which rest upon the inner sole of the shoe. It has been the usual practice to shape the body of the toe form over a last from a single piece of material and in order to provide such flanges it is necessary to wipe or otherwise fold the edge of the material under the bottom of the last either by blades or by a multi-part die. The toe form has also been heretofore expanded and contracted laterally by a crossbrace supported upon the ball flanges or has been yieldably held in contact with the side walls of the form by a spring element carried by such flanges.

The primary object of this invention is to provide a toe form without such ball flanges whereby it can be shaped in a single operation and the amount of material necessary is reduced to a minimum.

A further object of this invention is to provide the toe form with means which coact with the insole of the shoe to hold the toe form yieldably in contact with the toe of the shoe plumping it out at the break of the vamp, and if desired at the sides thereof. The shoe at the break of the vamp particularly needs a yielding support since it thereby assumes a pleasing position and gives that appearance of a narrowness which is desired by the trade.

These and other objects will appear from a consideration of the following description and of the drawings which form a part thereof, and in which Fig. 1 is a side elevational view of a shoe partially broken away in which a toe form embodying this invention is inserted;

Fig. 2 is a bottom plan view of such toe form;

Fig. 3 is a longitudinal sectional view thereof;

Fig. 4 is a cross-sectional view taken along the line 4—4 of Fig. 3;

Figure 19:
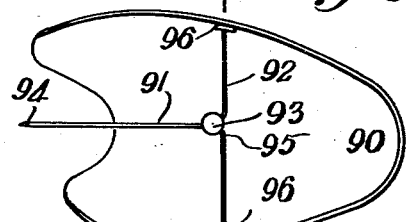
Figure 20:
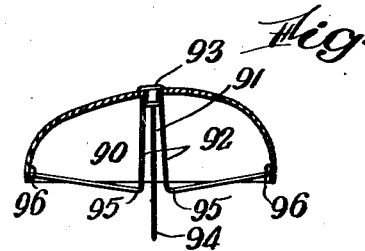

Figs. 5 and 6, 7 and 8, 9 and 10, 11 and 12, 13 and 14, 15 and 16, and 17 and 18 illustrate other embodiments of this invention in bottom, plan and longitudinal cross-sectional views, respectively; and Figs. 19 and 20 illustrate still another embodiment of this invention, Fig. 19 being a bottom plan view thereof and Fig. 20 being a cross-sectional view, taken along the line 20—20 in Fig. 19.

It will be noted that in each embodiment of the invention the body of the toe form is flangeless and that the toe form is yieldably held in contact with the wall of the toe of the shoe to plump it out either at the break of the vamp (Figs. 5 and 6, 7 and 8, 9 and 10, 15 and 16) or at both the break of the vamp and the sides (Figs. 1 to 4 inclusive, 11 and 12, 13 and 14, 17 and 18, 19 and 20) by means bearing upon the inner sole of the shoe.

The embodiment shown in Figs. 1 to 4 comprises a toe form 10 the body portion of which is yieldably held in contact with the toe of a shoe 12, by spring strips 13 and 14. The strip 13 is secured at one end to the strip 14 at approximately the center thereof by a rivet 15 and is tapered to form a prong 16 at the other end. As shown particularly in Figs. 1 and 4, the strip 13 extends forwardly from the rivet 15 and is bent downwardly and rearwardly. The prong 16 is bent downwardly so that the lower portion of the strip 13 and the prong project below the lower edge of the body member. The strip 14 terminates in loops 17 which like the prong 16 project below the lower edge of the toe form. About midway between the rivet 15 and the loop 17 the strip 14 is secured to the form 10 by rivets 18.

Figs. 5 and 7 illustrate an embodiment comprising a toe form 20 to which are secured spring strips 21 and 22. The strip 21 extends longitudinally of the form and is attached to the form at its forward end by a rivet 23 and intermediate its ends by a rivet 24. The rearward end of the strip is sharpened to provide a prong 25. The portion of the strip between the rivets 23 and 24 is bent back upon itself to form a loop 26. The strip 22 extends transversely of the form bearing yieldably against the wall thereof and is attached thereto midway of its length by the rivet 24. It will be noted that the rivet 24 is located at approximately the break of the vamp. As shown in Fig. 5, the prong 25 the loop 26 of the strip 21 extend below the lower edge of the form while the strip 22 terminates short of such edges.

The embodiment shown in Figs. 7 and 8 comprises a toe form 30 and spring wires 31 and 32 secured to the form by rivets 33 and 34. The wire 31 extends longitudinally of the form and is attached thereto at the forward end by the rivet 33. The rearward end of the wire 31 terminates in a prong 35 which projects below the lower edge of the form. The wire 32 is bent at its center to engage the shank of the rivet 33. From the center each half is bent downwardly outwardly and rearwardly in contact with the inner face of the form and is attached to the form at its rearward ends by the rivets 34.

Figs. 9 and 10 illustrate an embodiment comprising a toe form 40 provided with a spring wire 41 secured to the form by rivets 42. The portion of the wire 41 between the rivets is bent forwardly, downwardly and rearwardly to provide a loop 43 which projects below the lower edge of the form. The portions of the wire beyond the rivets extend downwardly in contact with the inner face of the wall of the toe form and hold it yieldably expanded at each side.

The embodiment shown in Figs. 11 and 12 comprises a toe form 50 and a spring wire 51 attached to the form by rivets 52 and 53. The rivet 52 attaches the middle of the wire to the form at substantially the break of the vamp and the rivets 53 attach the end of the wire to the form adjacent the forward end thereof. Each portion of the wire between the rivets 52 and 53 extends rearwardly and laterally from the rivet 52, bent into a coiled loop 54 and extends forwardly beyond the rivet 53 and then rearwardly into contact therewith. As shown in Fig. 12 a portion of the loop 54 projects below the lower edge of the form.

Figure 13:
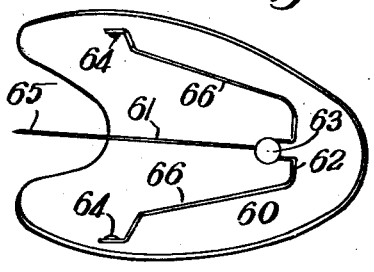
Figure 14:
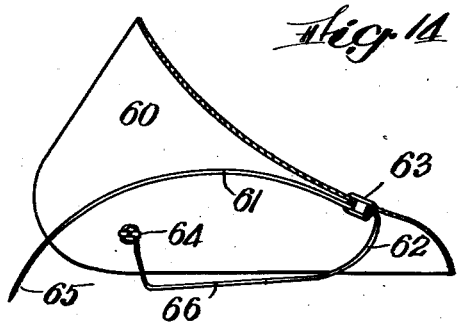

The embodiment shown in Figs. 13 and 14 comprises a toe form 60 and spring wires 61 and 62 secured to the toe form by rivets 63 and 64. The wire 61 extends longitudinally of the form, is secured thereto at the forward end by the rivet 63 and terminates at the rearward end in a prong 65 which projects below the lower edge of the form. The wire 62 is secured to the form at its middle by the rivet 63 and at its ends by the rivets 64. Each portion of the wire between the rivets 63 and 64, beginning at the rivet 63, is bent forward, laterally, downwardly, rearwardly and upwardly. The loops 66 so formed are normally below the lower edge of the form.

Figure 15:
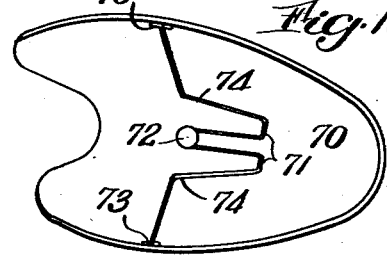
Figure 16:
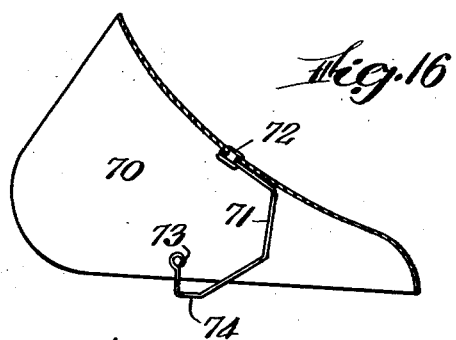

The embodiment shown in Figs. 15 and 16 comprises a toe form 70 and a spring wire 71 secured to the form by a rivet 72. The rivet 72 is located at approximately the break of the vamp and engages the spring wire 71 at the middle. Each half of the wire is so bent that it extends forwardly from the rivet 72, then downwardly and laterally, then downwardly and rearwardly, then rearwardly and then laterally and slightly rearwardly. The ends of the wire terminate at the side walls of the form and may be provided with heads 73 or be riveted to the form to hold them in place. Loops 74 so formed by the bent wire project below the lower edge of the form.

Figure 17:
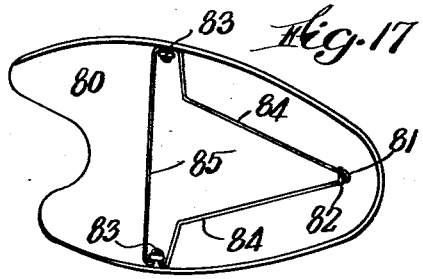
Figure 18:
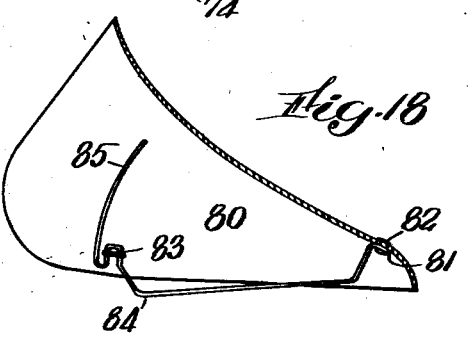

The embodiment shown in Figs. 17 and 18 comprises a toe form 80 and a spring wire 81 secured to the form by rivets 82 and 83. The rivet 82 engages the toe form adjacent the forward tip thereof and the rivets 83 engage the toe form at each side near the lower edge thereof. The portion of the wire between the rivet 82 and each rivet 83 beginning at the rivet 82 is bent downwardly, then laterally and downwardly and then laterally and upwardly, a loop 84 formed thereof projecting below the lower edge of the form. The portion 85 of the wire between the rivets is preferably arcuate and serves to hold the side walls yieldably in their normal position.

The embodiment shown in Figs. 19 and 20 comprises a toe form 90 and spring wires 91 and 92 secured to the form by a rivet 93. The wire 91 which extends longitudinally of the form, is attached to the form at its forward end by the rivet 93 and terminates at its rearward end in a prong 94 which projects below the lower edge of the form. The wire 92, which extends transversely of the form, is attached to the form at the center by the rivet 93 located at approximately the break of the vamp. At each side of the rivet the wire 92 is bent downwardly and then laterally forming an angle 95 and terminating at the side walls of the form. The ends of the wire may be headed, as shown at 96, or secured to the form by rivets or the like. The angles 95 like the prong 94 project below the lower edge of the form.

It will be noted that in each of the embodiments the toe form is provided with one or more elements projecting below the lower edge thereof. When the form is inserted in the toe of a shoe (see Fig. 1) the lower edge of the form either rests directly upon the insole of the shoe or is spaced a slight distance above it at the forward end of the form in order to bear against and support the wall of the toe of the shoe in which the form is inserted. The elements which project below the lower edge of the form bear against the insole of the shoe and yieldably hold the wall of the form against the wall of the toe at the break of the vamp and in some instances at the sides as well. The prongs 16 (Figs. 1 to 4), 25 (Figs. 5 and 6), 35 (Figs. 7 and 8), 65 (Figs. 13 and 14) and 94 (Figs. 19 and 20) yieldably hold the toe form advanced in the shoe and also raise the forms along the longitudinal centers thereof thus improving the appearance of the toe of the shoe. The loops 54 (Figs. 11 and 12), 66 (Figs. 13 and 14), 74 (Figs. 15 and 16), 84 (Figs. 17 and 18) and 95 (Figs. 19 and 20) act to raise the longitudinal center of the forms and also to expand the forms laterally. The loops 17 (Figs. 1 to 4) expand the forms laterally and the loops 26 (Figs. 6 and 7) and 43 (Figs. 9 and 10), raise the longitudinal center of the forms.

While certain embodiments of this invention have been shown and described it will be understood that I am not limited thereto and that other embodiments of this invention may be made without departing from the spirit and scope thereof as set forth in the following claims.

I claim:

1. A toe form comprising a body and means secured thereto, such means being so located and arranged that, when the form is inserted in a shoe, the means contact with the insole of the shoe and are caused by such contact to expand the wall of the body of the form against the wall of the toe of the shoe and to support the wall of the body yieldably at the break of the vamp of the shoe.

2. A toe form comprising a body and means secured thereto, such means being so located and arranged that, when the form is inserted in a shoe, the means contact with the insole of the shoe and are caused by such contact to expand the wall of the body of the form yieldably at the break of the vamp and raise that portion of the toe of the shoe to impart an appearance of narrowness to the shoe.

3. A toe form comprising a body and means secured thereto, such means being so located and arranged that, when the form is inserted in a shoe, the means contact with the insole of the shoe and are caused by such contact to expand the wall of the body of the form yieldably against the wall of the toe of the shoe and yieldably support the body of the form in a position in the shoe at the break of the vamp thereof.

4. A toe form provided with means secured thereto at a point which corresponds approximately with the break of the vamp of a shoe when the form is inserted therein, a portion of said means projecting beyond the lower edge of the form and contacting with the insole of the shoe to cause the toe form to raise the wall of the toe of the shoe at the break of the vamp.

5. A laterally expansible toe form provided with a yieldable element extending longitudinally of the form and being secured at one end to a point of the form which corresponds approximately with the break of the vamp of a shoe when the form is inserted therein, the other end of the element projecting beyond the lower edge of the form whereby it contacts with the insole of such shoe and because of such contact causes the form to raise the wall of the toe of the shoe at the break of the vamp.

6. A toe form provided with a yieldable element extending longitudinally of the form and being secured at one end to a point of the form which corresponds approximately with the break of the vamp of a shoe when the form is inserted therein, the other end of the element projecting beyond the lower edge of the form whereby it contacts with the insole of such shoe and because of such contact causes the form to raise the wall of the toe of the shoe at the break of the vamp, and a second element for yieldably expanding the side walls of the form.

7. A toe form provided with a yieldable element extending longitudinally of the form and being secured at one end to a point of the form which corresponds approximately with the break of the vamp of a shoe when the form is inserted therein, the other end of the element projecting beyond the lower edge of the form whereby it contacts with the insole of such shoe and because of such contact causes the form to plump out the wall of the toe of the shoe at the break of the vamp, and a second element extending transversely of the form and being secured at the center to the form, the ends of said second element projecting beyond the lower edge of the form whereby it contacts with the insole of such shoe and because of such contact causes the side walls of the form to expand.

8. A toe form provided with a yieldable element extending longitudinally of the form and being secured at one end to a point of the form which corresponds approximately with the break of the vamp of a shoe when the form is inserted therein, the other end of the element projecting beyond the lower edge of the form and terminating in a prong and an intermediate portion of the element being looped whereby the prong engages the insole of the shoe to prevent involuntary backward movement of the form and the looped intermediate portion engages the insole of the shoe and is caused to raise the form yieldably and plump out the shoe at the break of the vamp.

9. A toe form provided with a yieldable element extending longitudinally of the form and being secured at one end to a point of the form which corresponds approximately with the break of the vamp of a shoe when the form is inserted therein, the other end of the element projecting beyond the lower edge of the form and terminating in a prong and an intermediate portion of the element being looped whereby the prong engages the insole of the shoe to prevent involuntary backward movement of the form and the looped intermediate portion engages the insole of the shoe and is caused to raise the form yieldably and plump out the shoe at the break of the vamp, and a second element extending transversely of the form and being secured at the center to the form, the ends of such second element terminating in loops which project beyond the lower edge of the form whereby the loops contact with the insole of such shoe and yieldably expand the side walls of the form against the walls of the shoe toe to plump out the latter.

10. A toe form provided with a yieldable element secured intermediate its ends to the form at an area which corresponds approximately with the break of the vamp of a shoe when the form is inserted therein, the ends of said element bearing against the side walls of the form and the intermediate portions being shaped to provide loops which project beyond the lower edge of the form whereby when the form is inserted in the shoe, the loops contact with the insole of the shoe to yieldably expand the form at the side walls and raise the form, against the walls of the shoe toe, to plump out the latter.

11. A toe form provided with a yieldable element secured to the form adjacent the forward end of the form along the longitudinal center thereof and to the form at each of the side walls thereof, the portions of the element between the first point of securement and each of said last points being shaped to provide loops which project beyond the lower edge of the form whereby, when the form is inserted in the shoe the loops of the element contact with the insole of the shoe to expand the side walls of the form and raise the form along its longitudinal center against the walls of the shoe toe to plump out the latter.

12. A toe form provided with yieldable means secured thereto at a point which corresponds approximately with the break of the vamp of a shoe, when the form is inserted therein, said means including a loop which contacts with the insole of the shoe to raise the form along its longitudinal center against the wall of the toe of the shoe at the break of the vamp.

WILLIAM J. DE WITT.